United States Patent [19]

Palm et al.

[11] Patent Number: 4,526,590
[45] Date of Patent: Jul. 2, 1985

[54] COOLING AND CONDENSING OF SULFUR AND WATER FROM CLAUS PROCESS GAS

[75] Inventors: John W. Palm, Tulsa, Okla.; Lorenz V. Kunkel, Tyler, Tex.

[73] Assignee: Standard Oil Company (Indiana), Chicago, Ill.

[21] Appl. No.: 499,668

[22] Filed: May 31, 1983

[51] Int. Cl.³ .......................... F28B 1/02; C01B 17/02
[52] U.S. Cl. ............................................ 55/27; 55/73; 55/82; 423/574 R; 62/12
[58] Field of Search ............ 423/574 G, 574 R; 23/294 S; 62/12; 55/27, 73, 80, 82

[56] References Cited

U.S. PATENT DOCUMENTS

| | | | |
|---|---|---|---|
| 1,409,338 | 3/1922 | Fenton | 23/294 S |
| 1,957,006 | 5/1934 | Wescott | 55/73 |
| 2,258,305 | 10/1941 | Stirlen | 423/574 G |
| 2,708,983 | 5/1955 | McCarthy | 55/73 |
| 3,022,635 | 2/1962 | Hagler et al. | 62/12 |
| 3,157,480 | 11/1964 | van Beukering | 55/82 |
| 4,101,642 | 7/1978 | Tippmer | 423/574 R |
| 4,249,921 | 2/1981 | Lett et al. | 23/294 |
| 4,252,772 | 2/1981 | Way | 55/82 |
| 4,391,791 | 7/1983 | Palm et al. | 423/574 R |

Primary Examiner—Earl C. Thomas
Assistant Examiner—Jeffrey E. Russel

[57] ABSTRACT

The Claus process gas is cooled in a condenser to condense most of the sulfur vapor in solid form. The gas leaving the condenser is then further cooled to condense water without producing substantially any sulfur in an undesirable form. The resulting gas of reduced water content is useful in Claus reaction, particularly the low temperature Claus reaction in which the product sulfur is adsorbed on the catalyst.

5 Claims, 2 Drawing Figures

COOLING AND CONDENSING OF SULFUR AND WATER FROM CLAUS PROCESS GAS

BACKGROUND OF THE INVENTION

This invention relates to processes and apparatus for recovering sulfur. In particular, it relates to cooling and condensing sulfur and water from gaseous streams, such as, from the gas of a Claus process.

The Claus process is widely used by industry for production of elemental sulfur. The process is designed to carry out the Claus reaction:

$$2H_2S + SO_2 \rightleftharpoons 2H_2O + 3S$$

A catalyst may be used for the reaction. The reaction is favored by the condensation and removal of water.

It is not possible to obtain complete conversion to sulfur by this reaction because the ratio of $H_2O/H_2S$ in the gas increases with increasing conversion and because this ratio has a limit determined by thermochemical equilibrium (and by the concentrations of $SO_2$ and sulfur vapor in the gas). In recent years these plants have been required by governmental agencies to obtain higher conversion of the $H_2S$ and $SO_2$ to product sulfur, in order to decrease the air pollution resulting from discharge of the sulfur plant tail gas incinerator effluent into the atmosphere. Several methods have been developed to accomplish this, and these are generally referred to as tail gas cleanup methods. However these methods are complex, they have high investment and operating costs, and they require considerable energy to operate.

A preferred alternate method for converting additional $H_2S$ and $SO_2$ to sulfur would be to reduce the water concentration before each catalytic reaction stage of the Claus process, or at least before the final stage. This method has not been used because there has not been a practical method available for condensing and removing the water.

A method that could be used for cooling the gas to effect the condensation of water is a quench system such as that disclosed in U.S. Pat. No. 3,681,024 (Hujsak and Palm). However, such quench system is complicated and therefore expensive to manufacture and to operate.

The use of a simple water quench system suffers from yet another problem. Such system would result in the condensation of sulfur vapor from the gas stream in colloidal or other undesirable form. The resulting sulfur would have to be remelted or otherwise converted into a useful form.

There is therefore a long felt and still unsatisfied need for an inexpensive process that would condense water from gas streams in a Claus process with low energy consumption and without condensing sulfur in colloidal or other undesirable form. The present invention achieves the above-stated goal with a process which utilizes simple, reliable and inexpensive equipment that can be manufactured from commercially available parts.

BRIEF DESCRIPTION OF THE INVENTION

The present invention improves the sulfur recovery efficiency, energy efficiency and economy of processes for recovery of elemental sulfur by employing a simple and inexpensive process for removing water from a Claus process gas.

In accordance with the present invention the Claus process gas is cooled in a condenser to condense most of the sulfur vapor in solid form. The gas leaving the condenser is then further cooled to condense water without producing substantially any sulfur in an undesirable form. This gas with reduced water content can then be subjected to low temperature Claus reaction.

DETAILED DESCRIPTION OF THE INVENTION

The present invention provides an inexpensive and efficient process and a system for condensing and removing water from a gas stream which contains vaporized sulfur without condensing sulfur in an undesirable form. The removal of the water improves the efficiency of the Claus process without a substantial increase in energy consumption.

Figure 1:
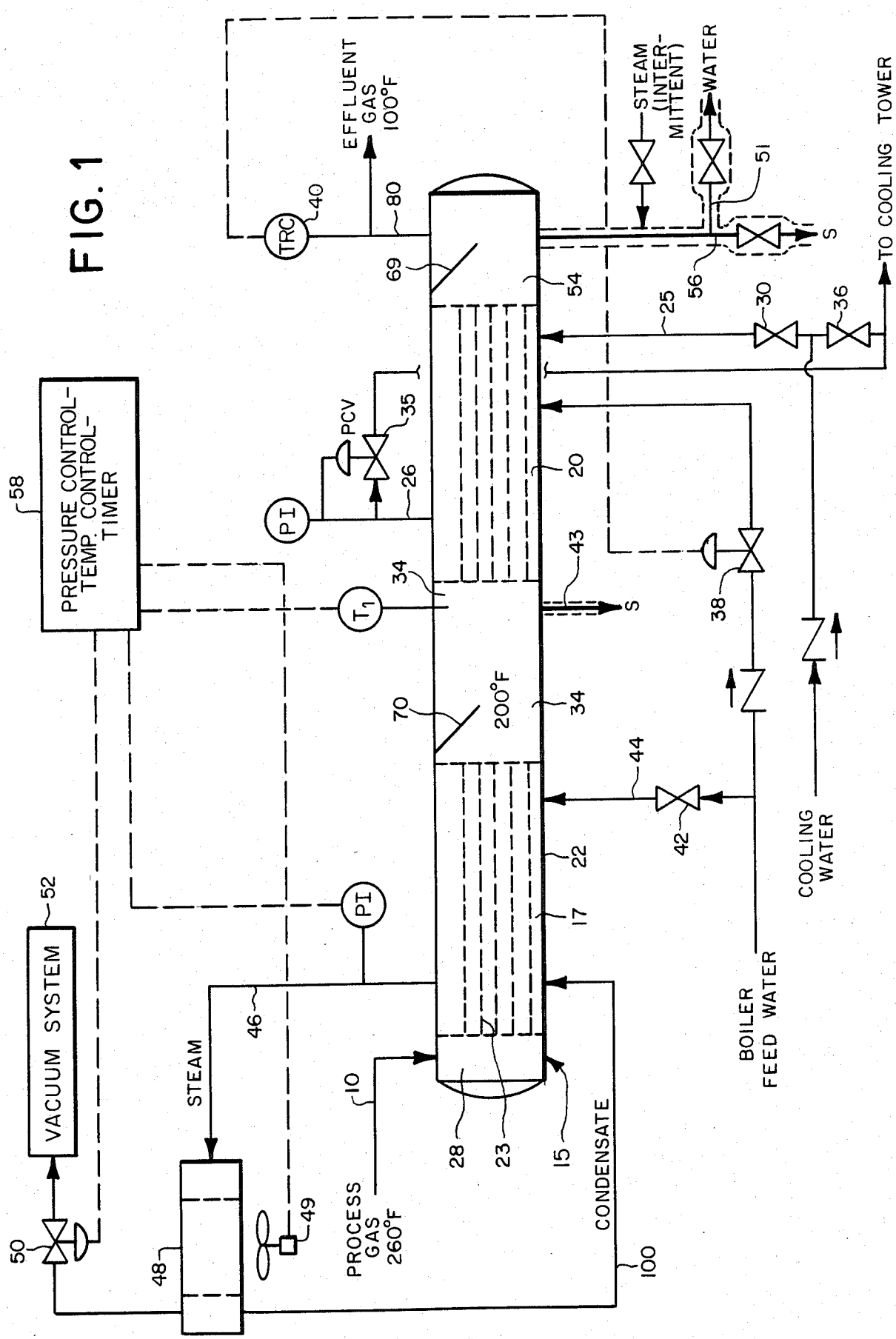
FIG. 1 is a schematic view of the preferred embodiment of the system and the process apparatus of the present invention.

The process and the system of the present invention will now be described in connection with the drawing. Referring now to FIG. 1, the incoming gas stream containing vaporized elemental sulfur is passed via a line 10 into a heat exchanger 15. The heat exchanger 15 includes two two-heat exchange zones 17 and 20. The first zone 17 is operated at such conditions, including temperature, so as to effect the condensation of elemental sulfur at a temperature below the melting point of sulfur but without condensing water. The second zone 20 is maintained at conditions, including temperature, that effect the condensation of water.

The process of and system of the present invention offer numerous advantages. First, they are simple and inexpensive.

Second, the system and the process of this invention improve the sulfur recovery efficiency of the Claus process.

Third, the system and the process of the present invention produce sulfur in a desirable form.

Fourth, only a small net increase in energy consumption is required.

Other advantages of this invention will become apparent to those skilled in the art upon studying this disclosure.

The present invention can be used for treating any gas stream that contains vaporized elemental sulfur. Presently, it is particularly useful for treating gas streams in the Claus process. It can also be used to treat the effluent from the last reactor of the modified Claus process before said effluent is passed to the CBA (low temperature catalytic) reactor.

The present invention will now be described in connection with the preferred embodiment thereof.

THE PREFERRED EMBODIMENT OF THE PRESENT INVENTION

Referring now to FIG. 1, the numeral 15 designates generally a two-zone condenser. The condenser 15 includes a first heat exchange section 17 and a second heat exchange section 20. The heat exchange sections 17 and 20 are constructed as a form of conventional shell and tube heat exchangers. A shell 22 contains a plurality of parallel tubes 23.

The cooling medium for heat exchange section 17 will be described first. Boiler feed water is fed through valve 42 and line 44 to the shell side of heat exchange section 17. Steam evolves from the top of the shell side and flows through line 46 to condenser 48, then the condensate from the condenser 48 is returned through line 100 to the shell side.

A vacuum system 52 and control valve 50 are used to reduce the pressure in condenser 48 to vary the boiling point temperature of the boiler feed water in the shell side, which in turn controls the temperature of the process gas leaving tubes 23 and passing through section 34. A pressure control-temperature control-timer system 58 is provided which controls the temperature of the process gas in section 34 as follows. The temperature is normally less than 225° F., typically about 200° F., which is low enough to condense substantially all of the sulfur from the process gas with no condensation of water, and with this sulfur depositing in the tubes as a solid. Periodically, about once a day, the temperature is increased to at least 240° F., typically about 255° F., which causes the solid sulfur to melt and drain out of tubes 23 into section 34.

Section 34, located between the two heat exchange sections 17 and 20, provides a space for the separation of liquid sulfur from the vapor. The sulfur is removed from the section 34 via a line 43.

The cooling medium for exchange section 20 will now be described. During normal operation, cooling water is fed through valve 30 and line 25 into shell side of heat exchange section 20. Cooling water at higher temperature exits from shell side through line 26 and valve 35 and thence to the cooling tower for reuse. The temperature in heat exchange section 20 is maintained sufficiently low to effect condensation of water. The temperature of gases leaving section 20 should be no higher than 125° F. and generally is about 100° F.

During operation for a period of about a week or longer, some solid sulfur will collect in the tubes of section 20, causing a gradual increase in temperature of the effluent gas in line 80. When a noticeable rise has occurred, the temperature of section 20 is increased to melt the sulfur, causing it to drain into section 54 and thence into drain line 56. The temperature of section 20 can be increased by the following method. The valve 36 is opened; the valve 30 is closed; and valves 38 and 35 are opened to replace cooling water by boiler feed water. All cooling water is flushed out of section 20 and replaced with boiler feed water. The pressure control valve 35 is set to maintain the desired backpressure, such as 60 psig, on the shell side of section 20, then set the temperature recorder controller 40 at the desired effluent temperature such as 255° F.

When the above procedure is followed the sulfur melts in a very short time, generally in less than an hour. The normal flow of cooling water may then be restored to heat exchange section 20, to reduce the gas temperature again to about 100° F. During the sulfur melting operation the water is not removed from the effluent gas in line 80, and the sulfur content of the gas increases. This will temporarily reduce the sulfur recovery efficiency of the downstream equipment. More complex equipment could be supplied to prevent this temporary high water and high sulfur condition, but this would increase the cost and the overall time-average sulfur recovery would probably not be increased enough to justify the higher cost.

The above details are given in order to furnish a full and complete description of the preferred embodiment of the invention. However, other arrangements of equipment to accomplish melting of sulfur from the tubes in heat exchange section 20 can also be employed. For example, the system can be modified to prevent a small loss of boiler feed water to the cooling water system which occurs with the above method. Nevertheless, the method described above is simple, inexpensive and yet is effective and prevents contamination of the boiler water system by cooling water.

Lines 43, 51 and 56 are steam jacketed. The steam to the jacket on line 51 may be turned off when it is not needed.

To promote the efficiency of removal of water and solid or liquid sulfur the condenser 15 is provided with baffles. Specifically, the end section 54 and the section 34 include diagonal baffles 69 and 70, respectively.

In operation, a gas stream containing vaporized elemental sulfur is passed through the line 10 into section 28 of the condenser 15. Since the gas stream is generally at a temperature of about 260° F, water is present as a vapor in the section 28. From section 28, gases are passed into the heat exchange section 17 which normally is maintained at temperatures low enough to cause the condensation and solidification of elemental sulfur. Generally, the temperature of gases leaving section 17 is below about 225° F. or typically about 200° F. In the preferred embodiment the gases are passed through the heat exchanger section 15 on the tube side. The cooling medium, generally water, is passed through the heat exchanger on the shell side. It should be understood, however, that the gases could be passed through the shell side and the cooling medium could be applied on the tube side. Also, the two heat exchange sections 17 and 20 may be side-by-side or one above the other if desired, instead of end-to-end as shown in the preferred embodiment.

The temperature of the cooling medium is controlled by varying the back pressure of the steam generated as the result of the heat exchange with gases and use of a vacuum system.

The cooling of gases in section 17 causes most of the sulfur vapor to condense on the inside surface of tubes 23. Periodically the effluent temperature is increased to the range of about 240° F. to 255° F. to melt the solid sulfur in the tubes. Then, the flow of gases pushes the liquid sulfur toward and into the liquid removal section 34. The accumulated liquid sulfur is removed from section 34 via the line 43.

The gas stream is then passed through the heat exchanger section 20. In the preferred embodiment, the gases are passed on the tube side and the cooling medium is applied on the shell side. The temperature in the heat exchange section 20 is maintained sufficiently low to effect condensation of water. The temperature of gases leaving section 20 is generally below about 125° F. and typically about 100° F. The required temperature is maintained in the heat exchange section 20 by passing water into the shell side thereof.

The gas stream is then passed into and through end section 54 where condensed water is removed via line 51. The gas stream exits via the line 80.

Before the sulfur build-up in the section 17 significantly restricts the flow of gases therethrough, the speed of a cooling fan 49 for the condenser 48 is reduced to increase the pressure of steam generated in heat exchanger shell side 22. This causes melting of the accumulated sulfur. Generally, the temperature in section 17 is raised sufficiently to increase the temperature of the gas which flows from tubes 23 of section 17, thence into section 34, to above the melting point of sulfur (which is about 240° F.) and typically to about 255° F. The accumulated sulfur is removed from section 34 via steam-jacketed line 43.

After at least a substantial portion of solid sulfur is melted in heat exchanger section 17 the operating conditions are returned to the original state. The cyclic operation is continued for the duration of the process.

When the temperature of the effluent gas from the tubes of heat exchange section 20 has increased substantially due to sulphur deposition (for example, to the range of about 120° F. to 130° F.), cooling water flow is temporarily replaced by boiler feed water, which is controlled to increase the effluent gas temperature in line 80 from about 100° F. to about 255° F. and cause the solid sulfur in the tubes to melt. The resulting liquid sulfur flows into end section 54 and is drained through steam-jacketed line 56. After the sulfur melting procedure, the operation is returned to a normal effluent temperature in line 80 of about 100° F.

Figure 2:
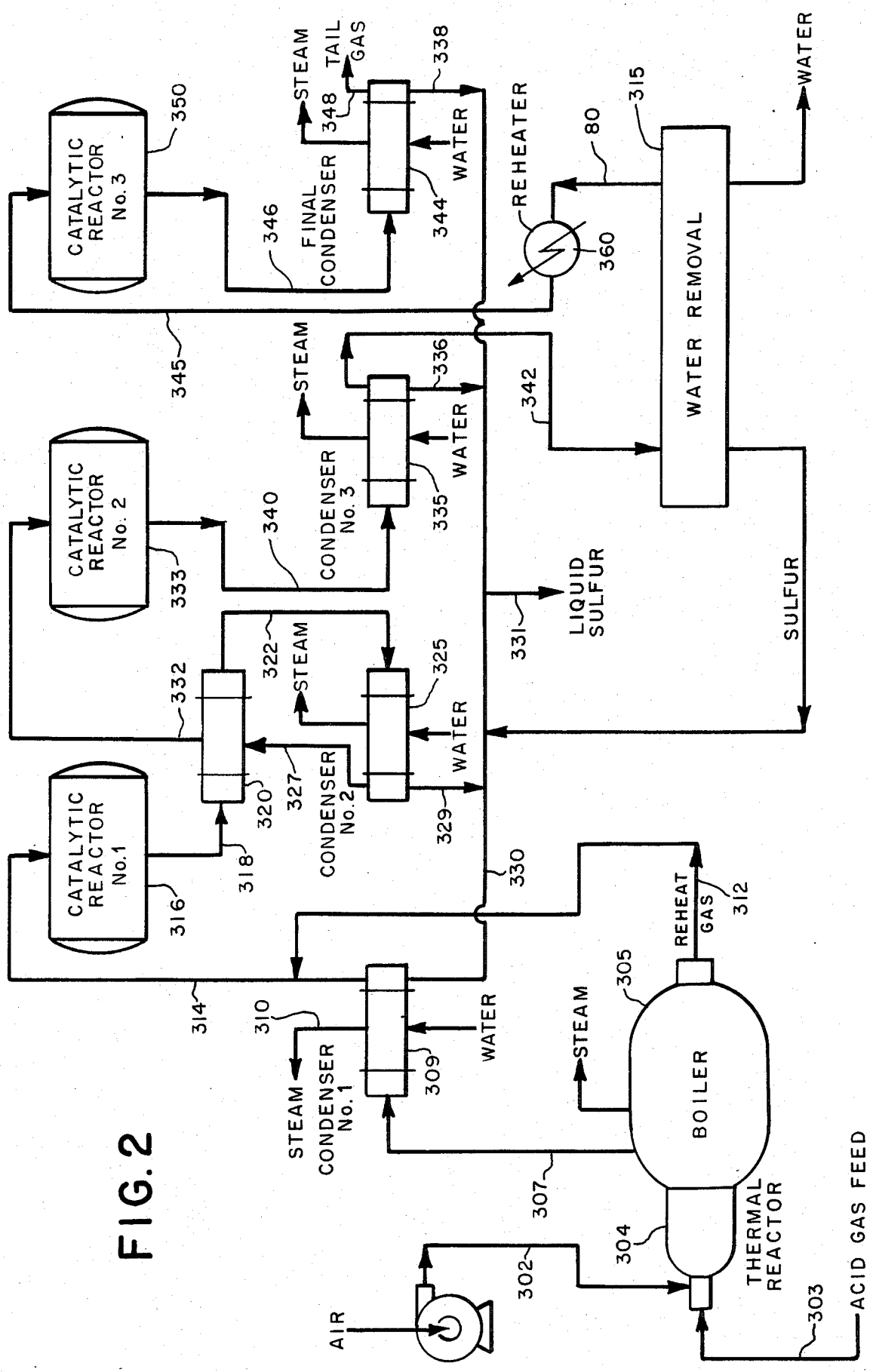
FIG. 2 is a flow diagram of a Claus reactor system which uses water removal process constructed in accordance with the present invention to obtain a high recovery of sulfur.

FIG. 2 is a diagram of the Claus process with a water removal step added.

MODIFIED CLAUS PROCESS EMBODYING THE PRESENT INVENTION

FIG. 2 depicts a modified Claus process that embodies the present invention. Briefly, air and acid gas are fed into a thermal reactor 304 via lines 302 and 303, respectively. Effluent gases from the thermal reactor 304 are cooled in boiler 305. The resulting gases are split. One portion at about 600° F. (316° C.) is passed by line 307 to a first condenser 309 which condenses vaporized sulfur. The steam generated by the heat exchanger leaves via a line 310. The second portion at about 900°–1200° F. (482°–649° C.) is passed via a line 312 and combined in line 314 with gases from the first condenser 309. The gases leave the first condenser at about 400° F. (204° C.). The sulfur is removed from the condenser 309 via a line 330 and recovered. After the reheat gas 312 is combined with gases from the condenser 309 the gas stream 314 is at about 450°–500° F. (232°–260° C.). The gas stream is then passed to a catalytic reactor 316 where further conversion of $H_2S$ and $SO_2$ into elemental sulfur takes place. The elemental sulfur passed by line 318 from catalytic reactor 316 is recovered via a line 329 after passage through heat exchanger 320, line 322, and condenser 325. Liquid sulfur is removed by line 331 via lines 330, 329, 336, and 338, from condensers 309, 325, 335, and 344, respectively. The gaseous stream is passed via line 327, heat exchanger 320, and line 332 into a second catalytic reactor 333. The effluent from the second catalytic reactor 333 is passed via a line 340, condenser 335, and line 342 into the water removal device 315 of the present invention such as that shown in FIG. 1 and described above. The apparatus 315 is operated in the manner described above and produces gas with substantially reduced water content. The reduced water content gas is then transported via lines 80 and 345 to catalytic reactor No. 3 of the Claus process 350 for further processing. A reheater 360 is provided to heat the gas in line 80 which goes in line 345 to the third catalytic reactor 350. The final condenser 344 may be provided to condense sulfur from the gas which leaves the third reactor 350 via line 346. Tail gas is removed by line 348 from final condenser 344. However, the final condenser 344 is not needed if catalytic reactor 350 is operated as a CBA reactor.

EXAMPLE

Calculations indicate the effluent from Catalytic Reactor No. 2 would contain about 3.25 mols of $H_2S$ plus $SO_2$ per 100 mols of $H_2S$ in the acid gas feed, which corresponds to a conversion to sulfur of 96.75% at this point in the process. Passing the Catalytic Reactor No. 2 effluent gas through a water removal step and then through Catalytic Reactor No. 3 would result in an additional conversion of about 2.25% so the overall conversion to sulfur with three reactors would be about 99%.

The above example applies to the case in which Catalytic Reactor No. 3 is operated in a normal temperature range for a Claus reactor, such as about 400°–440° F. It would also be feasible to design Catalytic Reactor No. 3 to be operated as a "low temperature" reactor as in the Cold Bed Adsorption process described in U.S. Pat. No. 3,749,762, U.S. Pat. No. 3,758,676 and other patents. In this process the sulfur formed in Catalytic Reactor No. 3 would be adsorbed on the catalyst, which would require periodic regeneration by hot gas treatment. By feeding the effluent from the water removal step to a reactor of this design, more than 90% of the $H_2S$ plus $SO_2$ in the feed gas to Catalytic Reactor No. 3 could be converted to sulfur, which would result in an overall conversion efficiency of 99.7%. Therefore 99.7% of the $H_2S$ in the acid gas feed to the thermal reactor would be converted to sulfur in the total process.

When a "low temperature" or CBA reactor is used for Catalytic Reactor No. 3, then it is advantageous to use "chilled water" instead of "cooling water" for heat removal in heat exchange section 20. The "chilled water" would be supplied from a refrigeration system and would have a temperature in the range of about 32°–50° F. This would further reduce the water content of the gas in line 80 and would further increase the conversion of $H_2S$ and $SO_2$ to sulfur in Catalytic Reactor No. 3. For still further improvement, refrigerated glycol solution or other heat transfer medium could be used instead of chilled water. This coolant could have a temperature below 32° F., so the temperature of the effluent gas in line 80 could be reduced to about 35°–40° F. If a cooling medium other than cooling water or chilled water is used for heat exchange section 20, then boiler feed water would not be used during the high temperature phase to melt sulfur from the tubes of section 20. In this case the same fluid would be used in both the normal low temperature operation and the high temperature melting operation. During low temperature operation a pump would circulate the fluid at the required rate from the heat exchange section 20 to the refrigeration unit and then return to the heat exchange section 20. During high temperature operation the pump would circulate a smaller amount of the fluid to refrigeration, and most of the fluid would be bypassed directly back to the heat exchange sections, resulting in the proper heat transfer rate for high temperature operation.

The above example illustrates how this improved cooling and condensing of sulfur and water from Claus process gas can result in higher recovery of product sulfur and reduced air pollution, with substantially no increase in energy consumption.

Many changes and modifications will occur to those skilled in the art upon studying this disclosure. All such changes and modifications that fall within the spirit of this invention are intended to be included within its scope as defined by the appended claims.

We claim:

1. A process for removing water from a Claus process gas stream containing vaporized sulfur, said process comprising:

passing said Claus process gas stream through a sulfur condenser and removing liquid elemental sulfur therefrom and then (a) passing the resulting gas stream from said sulfur condenser through a first cooling zone maintained at such conditions, including temperature, so as to effect condensation and solidification of elemental sulfur without condensation of water;

(b) passing the resulting gas stream from said first cooling zone through a second cooling zone maintained at such conditions, including temperature, so as to effect condensation of water;

periodically increasing the temperature of said first cooling zone to melt solid sulfur accumulated therein; and periodically increasing the temperature of said second cooling zone to melt solid sulfur accumulated therein.

2. The process of claim 1 wherein the temperature of said gas stream as it exits the first zone maintained at conditions for effecting condensation of sulfur is less than about 225° F. and wherein the temperature of said gas stream as it exits the second zone maintained at conditions for effecting condensation of water is less than about 125° F.

3. The process of claim 2 wherein the temperature of said first cooling zone is periodically increased to at least about 240° F.

4. The process of claim 1 wherein said first cooling zone comprises a tube side of a shell-tube heat exchanger and wherein the temperature in said first cooling zone is maintained by passing water through the shell side of said heat exchanger.

5. The process of claim 1 wherein the first zone comprises a shell and tube heat exchanger and the second zone comprises a shell and tube heat exchanger.

* * * * *